United States Patent [19]

Haslinger et al.

[11] 4,191,504
[45] Mar. 4, 1980

[54] DUCT-MOUNTED TURBINE AND METHOD OF INSTALLING THE SAME

[75] Inventors: Leopold Haslinger, Linz; Josef Krenn, Traun, both of Austria

[73] Assignee: Vereinigte Osterreichische Eisen- und Stahlwerke-Alpine Montan Aktiengesellschaft, Vienna, Austria

[21] Appl. No.: 844,639

[22] Filed: Oct. 25, 1977

[30] Foreign Application Priority Data

Nov. 2, 1976 [AT] Austria ................................. 8109/76

[51] Int. Cl.$^2$ ............................................. F01B 25/02
[52] U.S. Cl. ................................... 415/1; 415/219 R; 415/160
[58] Field of Search ................... 415/500, 219 R, 155, 415/160, 136, 137

[56] References Cited

U.S. PATENT DOCUMENTS

| | | | |
|---|---|---|---|
| 2,651,492 | 9/1953 | Feilden | 415/137 |
| 3,535,540 | 10/1970 | Boulogne | 415/219 R |
| 3,973,869 | 8/1976 | Doll et al. | 415/136 |
| 3,979,809 | 9/1976 | Schneider | 228/170 |
| 4,078,812 | 3/1978 | Beckershoff | 415/136 |
| 4,102,599 | 7/1978 | Ziegler | 415/219 |

FOREIGN PATENT DOCUMENTS

| | | | |
|---|---|---|---|
| 712658 | 9/1941 | Fed. Rep. of Germany | 415/160 |
| 2422262 | 11/1974 | Fed. Rep. of Germany | 415/219 R |
| 1074172 | 10/1954 | France | 415/160 |
| 723798 | 2/1955 | United Kingdom | 415/500 |

Primary Examiner—William L. Freeh
Attorney, Agent, or Firm—Kurt Kelman

[57] ABSTRACT

An annular inner vane cover is axially spaced from a rotatably mounted runner and has first and second flanges. An annular water guide is disposed between said runner and said inner vane cover and has a third flange, which is jointed to said first flange. An inner tubular housing has a fourth flange, which is joined to said second flange. An annular runner cover surrounds said runner and has a fifth flange. An annular outer vane cover surrounds said inner vane cover and is radially spaced therefrom and has a sixth flange joined to said fifth flange, and a seventh flange. An outer tubular housing surrounds the inner tubular housing and is radially spaced therefrom and defines a welded interface with said outer vane cover. Outer and inner vane mounts are carried by said outer and inner vane covers, respectively. A plurality of vanes are provided, each of which is mounted for rotation on its own axis in one of said outer vane mounts and one of said inner vane mounts. Said flanges lie in parallel planes. Each of said outer vane mounts is adapted to be released for a movement in a direction which is normal to the axis of the associated vane when said inner and outer tubular housings and said inner and outer vane covers have been installed in the site and joined at said flanges. The inner and outer tubular housings and said inner and outer vane covers provided with said vane mounts and said vanes are installed on the site and the inner and outer vane covers are joined at flanges before said outer annular housing and said outer vane covers are welded at said interface. Each of said outer vane mounts is then released for a movement in a direction which is normal to the axis of the associated vane, and said outer tubular housing and said outer vane cover are welded at said interface when said outer vane mounts are thus released.

3 Claims, 1 Drawing Figure

U.S. Patent    Mar. 4, 1980    4,191,504
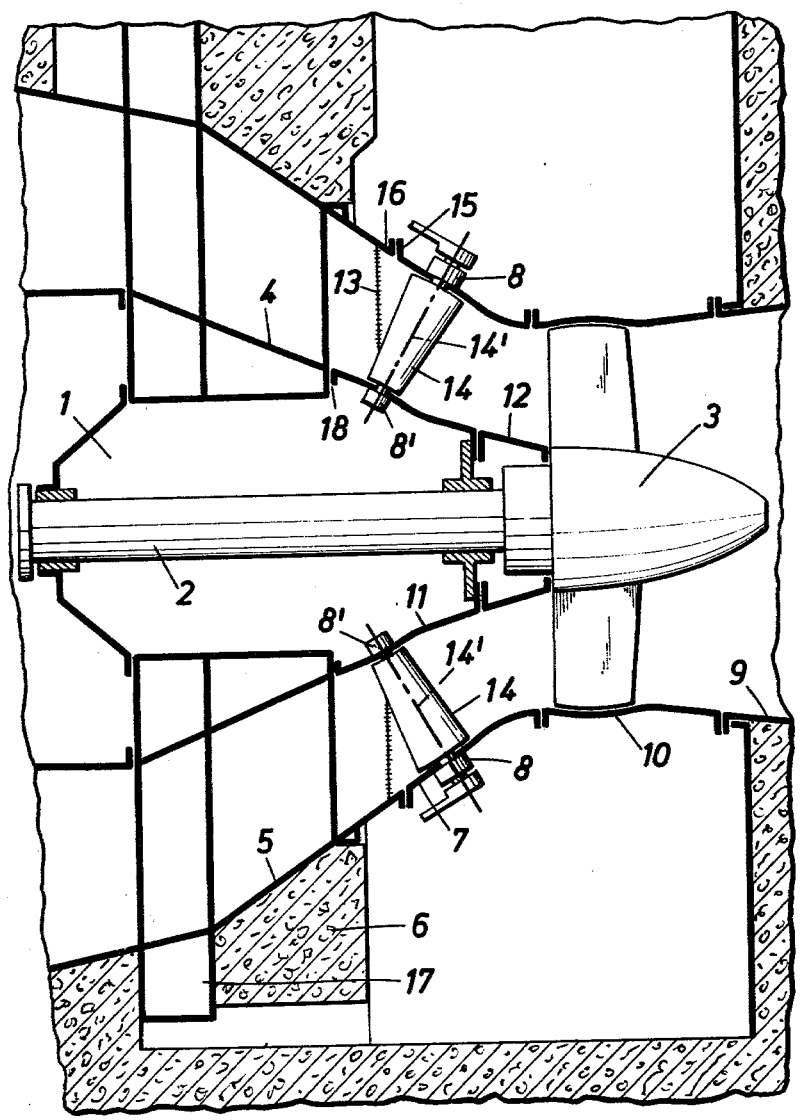

DUCT-MOUNTED TURBINE AND METHOD OF INSTALLING THE SAME

This invention relates to a duct-mounted turbine, which comprises outer and inner tubular housings, outer and inner annular vane covers, vanes mounted in said vane covers, an annular runner cover, an annular water guide and flanges which extend in parallel planes and connect the outer vane cover to the runner cover and connect the inner vane cover to the inner tubular housing and to the water guide.

Such duct-mounted turbines are mainly used in power plants located at rivers, which have only a small head. The power capacity of such turbines depends on the rate at which water can be processed. In view of this limitation, increasingly large duct-mounted turbines are being built and require closer manufacturing tolerances. Difficulties may arise in the installation of the turbines because the parts thereof can no longer be associated with each other as precisely as is required. Whereas turbines of small or medium size can be installed with reasonably high accuracy, the installation of large turbines, which in most cases must be assembled on the site, gives rise to difficulties which increase with the size of the turbine. In that connection it is particularly undesirable that the numerous flanged joints which are required cannot be made with the required precision. In the previous practice, the flanges provided at the tubular housing to connect the same to the stator of the generator, the carrying structure, and the inner vane cover are machined and are then joined to the outer housing and exactly positioned. The flange on the outer tubular housing is then marked as is required for its machining and is then machined separately from the flange on the inner tubular housing. When the sections of the composite outer tubular housings have thus been prepared, they are separately supplied to the site, on which they are placed in position, tacked and welded. The welding operation is succeeded by the exact positioning and the placing of the concrete in which the outer housing is embedded. The tolerances to be adhered to in installing the tubular housing amount to ±0.3 mm regarding the planarity of the flanges and to ±0.5 mm regarding the planoparallelism of the flanges. In known turbines of larger size, these tolerances cannot be adhered to without considerable machining on the site. Because these requirements regarding the mechanical accuracy of the flanges cannot be met, the required corrections must be made on the site. Even if the parts of turbines having a runner which is larger than 3.5 m in diameter are carefully manufactured and assembled, the close tolerances required for the flanges, i.e., their planarity, planoparallelism, and spacing, cannot be adhered to at al.. Besides, welding inevitably results in distortions and the placing of the concrete in which the outer tubular housing is embedded may result in additional deformations of the flanges of the outer tubular housing.

Whereas it has been proposed to avoid these difficulties in the installation in that the required machining operations are performed directly on the site, that practice involved a need for large and expensive special equipment and takes very long time. Because machining must be carried out on an open site, even the use of special equipment sometimes cannot eliminate the need for a final manual grinding.

It is an object of the invention to eliminate these disadvantages and to provide a duct-mounted turbine which is of the type described first hereinbefore and can be installed with the required accuracy, regardless of the size of the turbine, without difficult and without need for a high expenditure.

This object is accomplished according to the invention in that each of the vane mounts mounted in the outer vane cover is slidable in directions which are normal to the axis of the associated vane and the outer tubular housing and the outer vane cover define an interface which is parallel to the plane of the flanges and is adapted to be welded on the site when the vane assembly consisting of the vanes and the vane covers has been installed. Owing to that design, the flanges can be machined and associated with each other with the desired precision in the manufacturing plant because there is no need to flange the outer vane cover to the body of the outer tubular housing when the vane assembly is positioned and the inner vane cover is bolted to the inner tubular housing, this will automatically result in an adjustment at the interface, which is then simply closed by a seam weld. Because the vane mounts in the outer vane cover are slidable, the latter is freely movable during the welding operation so that the outer vane cover can take up the shrinkages which are due to the welding operation.

An embodiment of the invention is shown in a diagrammatic axial sectional view on the drawing.

The duct-mounted turbine according to the invention comprises a rotor 1, which is shown only in part and includes a turbine shaft 2 and a runner 3. The rotor is mounted in a tubular housing assembly 4, 5, which is anchored in a foundation 6. The outer tubular housing 5 is joined to an outer annular vane cover 7, which carries outer vane mounts 8 and is succeeded by an annular runner cover 10. This is adjoined by a draft tube liner 9. An inner annular vane cover 11 is provided with inner vane mounts 8' and joined to the inner tubular housing 4 and is continued toward the runner 3 by an annular water guide 12. Guide vanes 14 are rotatably mounted in the vane mounts 8, 8'. The outer vane mounts 8 are slidably mounted and each of them is adjustable by known adjusting means in a direction which is normal to the axis 14' of the associated vane. The tubular housing 5 defines an interface 13 with a conical portion 16, which carries a flange 15.

When the duct-mounted turbine according to the invention is to be installed, the draft tube liner is mounted first and is embedded in concrete. The tubular housing assembly is subsequently installed. For that purpose the inner tubular housing 4 is positioned and is anchored by supporting columns 17. The body of the outer tubular housing consists of a plurality of sections, which have been separately delivered to the site are then positioned, tacked and welded. When said assembled main part has been checked several times, it is embedded in concrete. In the meantime, the vane assembly consisting of the vane covers 7, 11, the guide vanes 14 and the vane mounts 8, 8' can be fitted on and firmly bolted to the flange 15 carried by the conical part 16. When the vane assembly has been exactly adjusted, the vanes 14 are fixed in an open position and the vane assembly is then lifted into position and bolted to the flange 18 of the inner tubular housing. The connection of the flange 18 of the inner tubular housing to the inner vane cover 11 results automatically in an adjustment at the interface 13. When the interface between the outer tubular housing 5 and the outer vane cover 7 has been tacked, the outer vane mounts 8 are unlocked so that the outer vane cover 7 is freely movable during the welding at the interface and can take up shrinkages which are due to such welding. When the position of the vane assembly has been adjusted, the outer mounts 8 are fixed in position and the remaining parts of the turbine are assembled.

Because the outer vane cover 7 is bolted to the flange 15 carried by the conical part 16 before the conical part 16 is associated with the outer tubular housing to define the interface 13, the conical part 16 is considered as a part of the outer vane cover 7 rather than as a part of the outer tubular housing.

What is claimed is:

1. A duct-mounted turbine, which comprises
a rotatably mounted runner,
an annular inner vane cover which is axially spaced from said runner and has first and second flanges,
an annular water guide disposed between said runner and said inner vane cover and having a third flange which is joined to said first flange,
an inner tubular housing having a fourth flange which is joined to said second flange,
an annular runner cover which surrounds said runner and has a fifth flange,
an annular outer vane cover which surrounds said inner vane cover and is radially spaced therefrom and has a sixth flange joined to said fifth flange,
an outer tubular housing which surrounds said inner tubular housing and is radially spaced therefrom a welded interface between said outer vane cover and outer tubular housing,
outer vane mounts carried by said outer vane cover,
inner vane mounts carried by said inner vane cover
and a plurality of vanes, each of which is mounted for rotation on its own axis in one of said outer vane mounts and one of said inner vane mounts,
said flanges lying in parallel planes,
each of said outer vane mounts being adapted to be released for a movement in a direction which is normal to the axis of the associated vane when said inner and outer tubular housings and said inner and outer vane covers have been installed on the site and said inner and outer vane covers have been joined at said flanges.

2. A turbine as set forth in claim 1, in which
said outer vane cover consists of a first part provided with said sixth flange and of a second part which defines said interface with said outer tubular housing and
said first and second part are connected to each other by flanges extending in a plane which is parallel to the planes of the others flanges.

3. A method of installing a duct-mounted turbine which comprises a rotatably mounted runner, an annular inner vane cover which is axially spaced from said runner and has first and second flanges, an annular water guide disposed between said runner and said inner vane cover and having a third flange which is joined to said first flange, an inner tubular housing having a fourth flange which is joined to said second flange, an annular runner cover which surrounds said runner and has a fifth flange, an annular outer vane cover which surrounds said inner vane cover and is radially spaced therefrom, outer vane mounts carried by said outer vane cover, inner vane mounts carried by said inner vane cover, and a plurality of vanes, each of which is mounted for rotation on its own axis in one of said outer vane mounts and one of said inner vane mounts, said flanges lying in parallel planes, each of said outer vane mounts being adapted to be released for a movement in a direction which is normal to the axis of the associated vane when said inner and outer tubular housings and said inner and outer vane covers have been installed on the site and said inner and outer vane covers have been joined at said flanges, which method comprises
installing said inner and outer tubular housings and said inner and outer vane covers provided with said vane mounts and said vanes on the site and joining said inner tubular housing and said inner and outer vane covers at said flanges,
releasing each of said outer vane mounts for a movement in a direction which is normal to the axis of the associated vane, and
welding said outer vane cover and outer annular housing along an interface while said outer vane mounts are thus released.

* * * * *